(12) United States Patent
Sakuma et al.

(10) Patent No.: US 8,258,670 B2
(45) Date of Patent: Sep. 4, 2012

(54) MOTOR INCLUDING SUPPORTING PORTION CONTACTING STATOR

(75) Inventors: Masafumi Sakuma, Chiryu (JP); Tomohiro Fukushima, Kariya (JP); Masayuki Nishimura, Obu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 365 days.

(21) Appl. No.: 12/262,807

(22) Filed: Oct. 31, 2008

(65) Prior Publication Data

US 2009/0108700 A1    Apr. 30, 2009

(30) Foreign Application Priority Data

Oct. 31, 2007  (JP) ................. 2007-284118

(51) Int. Cl.
*H02K 9/16* (2006.01)
*H02K 9/00* (2006.01)

(52) U.S. Cl. ............... 310/216.118; 310/52; 310/60 A; 310/89

(58) Field of Classification Search ............ 310/52, 310/89, 216.113, 216.114, 216.118, 216.119, 310/227, 60 A; *H02K 9/00, 9/16*
See application file for complete search history.

(56) References Cited

U.S. PATENT DOCUMENTS

| | | | | |
|---|---|---|---|---|
| 1,659,623 A | * | 2/1928 | Barr | 310/63 |
| 2,845,551 A | * | 7/1958 | Potter | 310/87 |
| 4,839,547 A | * | 6/1989 | Lordo et al. | 310/60 A |
| 5,237,230 A | * | 8/1993 | Sugiyama et al. | 310/113 |
| 5,559,380 A | * | 9/1996 | Nakamura et al. | 310/64 |
| 6,346,760 B1 | * | 2/2002 | Boardman, IV | 310/216.007 |
| 6,472,780 B2 | * | 10/2002 | Kikuchi et al. | 310/52 |
| 6,930,416 B1 | * | 8/2005 | Remington et al. | 310/51 |
| 7,705,496 B2 | * | 4/2010 | Zisler et al. | 310/60 A |
| 2007/0063593 A1 | * | 3/2007 | Braun et al. | 310/58 |

FOREIGN PATENT DOCUMENTS

| | | |
|---|---|---|
| JP | 56029434 A | 3/1981 |
| JP | 2000023415 A | 1/2000 |
| JP | 2005-151648 A | 6/2005 |
| JP | 2006296010 A | 10/2006 |
| WO | WO 2006037737 A1 * | 4/2006 |

OTHER PUBLICATIONS

Machine translation of WO 2006/037737 A1.*
Machine translation of WO 2006/037737 A1 (Document published Apr. 2006, translated Apr. 2012).*
Japanese Office Action dated May 31, 2012, issued in corresponding Japanese Patent Application No. 2007-284118.

* cited by examiner

*Primary Examiner* — Quyen Leung
*Assistant Examiner* — Michael Andrews
(74) *Attorney, Agent, or Firm* — Sughrue Mion, PLLC

(57) ABSTRACT

A motor includes a stator, a case and a supporting portion. The stator formed by laminating plural disc plates includes a yoke portion having a plurality of first and second portions alternately formed in a circumferential direction of the stator, and plural tooth portions respectively radially protruding from an inner circumferential surface the yoke portion at the second portion of the yoke portion towards an axial center of the stator. The case provided at an outer circumference of the stator includes a first communicating passage extending in an axial direction of the stator to be in communication with both axial ends of the stator and defined by an inner circumferential surface of the case. The supporting portion protrudes from an inner circumferential surface of the first communicating passage towards the stator and contacts an outer surface of the stator at one of the first portions of the stator.

13 Claims, 3 Drawing Sheets

MOTOR INCLUDING SUPPORTING PORTION CONTACTING STATOR

CROSS REFERENCE TO RELATED APPLICATIONS

This application is based on and claims priority under 35 U.S.C. §119 to Japanese Patent Application 2007-284118, filed on Oct. 31, 2008, the entire content of which is incorporated herein by reference.

FIELD OF THE INVENTION

The present invention generally relates to a motor.

BACKGROUND

An inverter driving type permanent-magnet synchronous motor, for example, includes a stator, which generates a rotational magnetic field when applied with alternating current by means of a switching element, and a rotor, which accommodates a permanent magnet therein and which is arranged to be rotatable relative to the stator.

The stator includes a yoke portion and plural tooth portions. The yoke portion is adapted to accommodate the rotor therein. Each of the tooth portions is provided at an inner circumferential surface of the yoke portion to radially protrude therefrom towards an axial center of the stator. Such stator includes wide portions, at which the tooth portions are formed, and narrow portions, at which the tooth portions are not formed. A width of each of the wide portions is arranged to be wider than that of each of the narrow portions because the tooth portions are formed at the wide portions. A stator coil is formed by directly winding wires on the tooth portions.

Due to such motor, an iron core may be provided at the stator and the rotor. The iron core is formed by laminating plural electromagnetic steel plates in an axial direction of the motor. The stator formed in such a manner is assembled to a case serving as an outer frame of the stator, for example, by shrink fitting. Further, the rotor is assembled to a rotational shaft, for example, by the shrink fitting.

For example, when the stator including the iron core formed by plural thin electromagnetic steel plates is assembled to the case by shrink fitting, a deformation such as buckling may be easily generated at outer electromagnetic steel plates, which are located at outward sides in a laminating direction. In order to prevent the generation of such deformation, for example, end plates made of non-magnetic material may be provided at both end portions of the laminated electromagnetic steel plates. However, in such a condition, a size of the motor is enlarged by the dimension of the end plates.

JP2005-151648A (hereinafter, referred to as reference 1) discloses a motor including an iron core. The iron core includes a first portion formed by laminating first electromagnetic steel plates and a second portion(s) formed by laminating second electromagnetic steel plates. The first portion and the second portion of the iron core are arranged to be adjacent to each other. Further, a thickness of each of the second electromagnetic steel plates is larger than that of each of the first electromagnetic steel plates.

So configured, a deformation of the first electromagnetic steel plates, which may be generated when the stator is assembled to the case, is prevented by the second portion(s). Further, the structure employing the end plates made of the non-magnetic material is not required, so that an increase of a size of the motor can be restrained.

In general, the iron loss of the motor is indicated with the sum of the hysteresis loss and the eddy-current loss. The degree of the eddy-current loss is proportional to a squared value of plate thickness. Therefore, when the thickness of the electromagnetic steel plates is increased, the ratio of the eddy-current loss is also increased.

The motor according to the reference 1 employs the electromagnetic steel plates (the second electromagnetic steel plates) of which thickness is increased. Therefore, the iron loss of the motor is also increased. Further, the motor according to the reference 1 is structured with the two types of electromagnetic steel plates, i.e., the first and second electromagnetic steel plates of which thickness are different from each other, thereby increasing material cost. Still further, the first and second electromagnetic steel plates are integrated after separately laminating the first electromagnetic steel plates and the second electromagnetic steel plates. Therefore, an assembling efficiency may be deteriorated.

Further, according to the motor of the reference 1, the stator is surrounded by the case, and a communicating passage may be required to be provided at the case. The communicating passage is formed by recessing an inner circumferential surface of the case and extends in the axial direction of the stator. The communicating passage is employed for a signal line which is to be inserted thereinto, or employed as an oil passage, for example. In a condition where the stator is assembled to the case which does not include any communicating passage by the shrink fitting or press fitting, a shrinking force acts evenly on an entire outer circumferential surface of the stator in a radial direction from the inner circumferential surface of the case. However, when applying the above described case including the communicating passage, there also exists a portion where the communicating passage is not formed. Accordingly, in such a condition, the shrinking force does not act evenly along whole the outer circumferential surface of the stator. The stator includes the wide portions, at which the tooth portions are formed, and the narrow portions, at which the tooth portions are not formed and of which rigidity is low. Therefore, deformation such as buckling may be easily generated at such narrow portions when assembling the stator into the case.

A need thus exists for a motor, which is not susceptible to the drawback mentioned above.

SUMMARY OF THE INVENTION

According to an aspect of the present invention, a motor includes a stator, a case and a supporting portion. The stator is formed in a cylindrical shape by laminating a plurality of disc plates. The stator includes a yoke portion accommodating a rotor therein and having a plurality of first portions and a plurality of second portions, which are alternately formed in a circumferential direction of the stator. The stator further includes a plurality of tooth portions respectively formed at the second portions of the yoke portion and radially protruding from an inner circumferential surface of the yoke portion at the second portion of the yoke portion towards an axial center of the stator. The case is provided at an outer circumference of the stator for supporting the stator. The case includes a first communicating passage extending in an axial direction of the stator and defined by an inner circumferential surface of the case. The first communicating passage is in communication with both axial ends of the stator. The supporting portion protrudes from an inner circumferential surface of the first communicating passage towards the stator and contacts an outer surface of the stator at one of the first portions of the stator.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
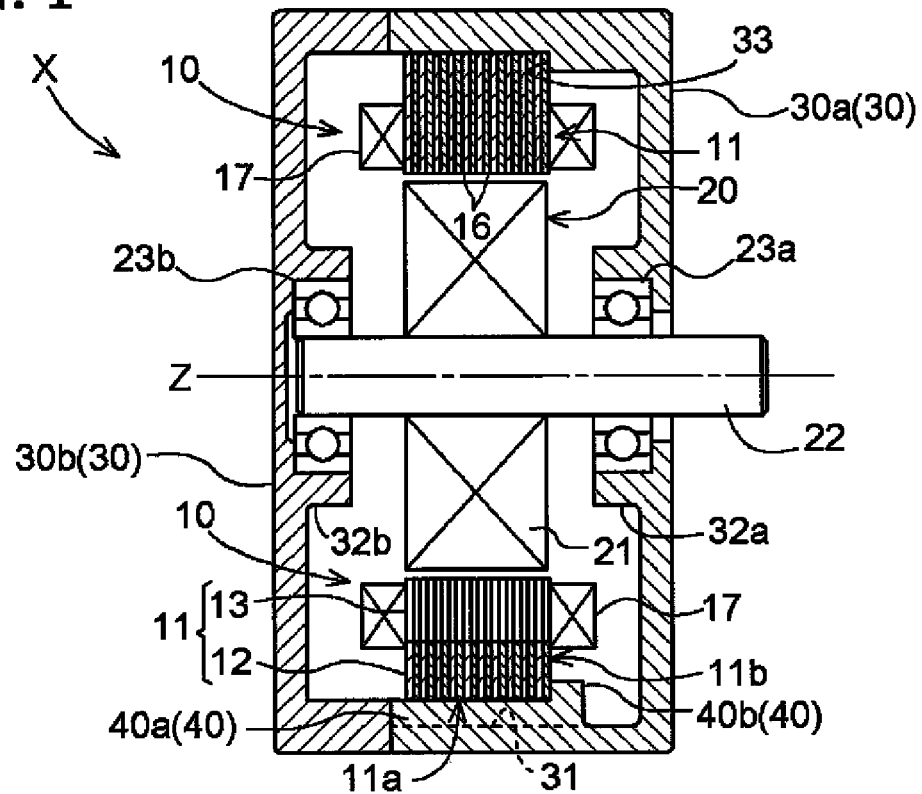
FIG. 1 is a cross sectional view, schematically illustrating a motor according to an embodiment, taken along an axial direction of the motor.
Figure 2:
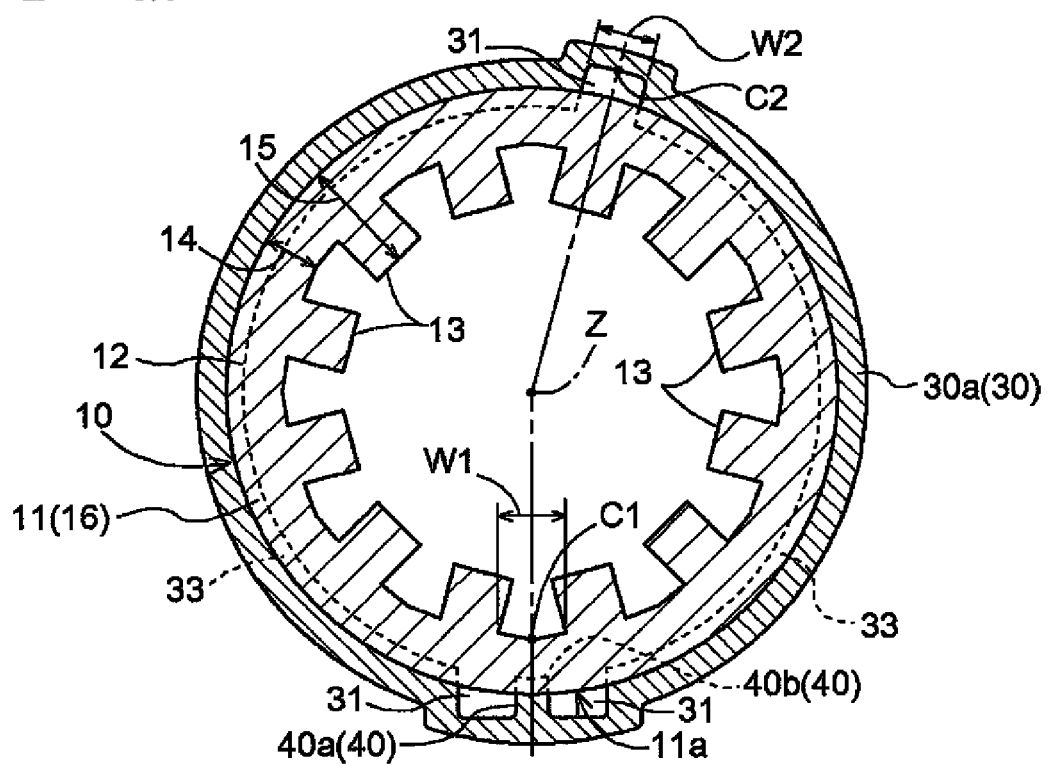
FIG. 2 is a cross sectional view, schematically illustrating the motor, taken along a direction perpendicular to the axial direction of the motor.
Figure 3:
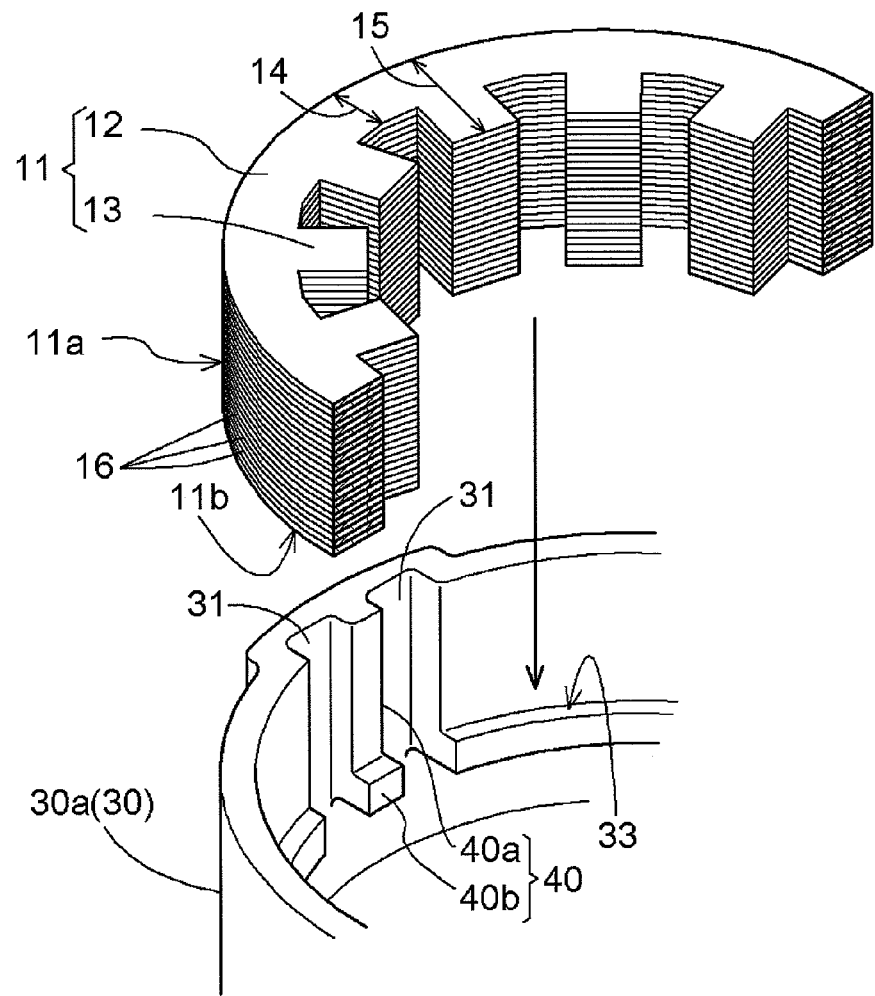
FIG. 3 is a schematic view illustrating a main portion of the motor.

An embodiment of the present invention will be described hereinafter with reference to the attached drawings. As illustrated in FIGS. 1 to 3, a motor X includes a stator 10, a rotor 20 and a case 30. The stator 10 generates a rotational magnetic field. The rotor 20 is provided inside the stator 10. Further, the rotor 20 includes a permanent magnet so that the rotor 20 is driven due to a change in the magnetic field of the stator 10. The case 30 houses (accommodates) the stator 10 therein.

The stator 10 is structured to generate torque by interacting with the rotor 20. The stator 10 includes a stator core 11 and a stator coil 17. The stator core 11 is formed in a cylindrical shape by laminating plural thin disc plates 16 in a direction of an axial center Z (shown in FIG. 1) of the motor X. (hereinafter, the direction referred to as Z-axial direction). Electromagnetic steel plates are employed as the thin plates 16. More specifically, the stator 10 (the stator core 11) includes a yoke portion 12 and plural tooth portions 13. The rotor 20 (serving as a yoke portion) is adapted to be accommodated inside the yoke portion 12. Each of the tooth portions 13 protrudes radially inwardly from an inner circumferential surface of the yoke portion 12 towards the axial center Z (serving as an axial center of the stator). The yoke portion 12 includes narrow portions 14 (serving as a plurality of first portions) and wide portions 15 (serving as a plurality of second portions), which are formed alternately in a circumferential direction of the stator 10. At the narrow portions 14, the tooth portions 13 are not formed. On the other hand, the plural tooth portions 13 are respectively formed at the wide portions 15, so that the radial length of the stator 10 (the stator core 11) becomes wide at each of the wide portions 15 than at each of the narrow portions 14.

The rotor 20 includes a rotor core 21 and a shaft 22 which rotates integrally with the rotor core 21. The rotor core 21 is structured with an iron core formed by laminating electromagnetic steel plates. The rotor core 21 includes a bore defined therethrough in an axial direction of the rotor core 21. A plate shaped permanent magnet is supported inside the bore of the rotor core 21. The shaft 22 is supported by bearings 23a and 23b.

The case 30 is provided at an outer circumference of the stator 10 for supporting the same. The case 30 is structured with brackets 30a and 30b. A bearing housing portion 32a is provided at the bracket 30a so as to accommodate the bearing 23a, and a bearing housing portion 32b is provided at the bracket 30b so as to accommodate the bearing 23b. The case 30 further includes plural communicating passages 31 (serving as first/second communicating passages) extending in the Z-axial direction to be in communication with both axial ends of the stator 10 and defined by an inner circumferential surface of the case 30. Each of the communicating passages 31 is a groove portion formed by radially outwardly recessing the inner circumferential surface of the case 30. A singular communicating passage 31 may be formed at the case 30. Each of the communicating passages 31 is employed for a signal conductor to be inserted thereinto, or employed as a lubrication passage.

Due to the motor X according to the embodiment, for example, a supporting portion 40 is provided at one of the communicating passages 31, of which a width in a circumferential direction of the case 30 is wider. More specifically, the supporting portion 40 radially protrudes from an inner circumferential surface (a bottom surface) of the communicating passage 31 (serving as a first communicating portion) towards the stator 10, so that the supporting portion 40 contacts an outer circumferential surface of the stator 10 at one of the narrow portions 14 of the yoke portion 12.

Thus, by providing the supporting portion 40, a deformation of the stator 10, which may occur when assembling the stator 10 to the case 30, is prevented from being generated.

In a condition where the stator 10 is assembled to the case 30 including the communicating passages 31 by a connecting method such as shrink fitting or press fitting, because the case 30 includes portions where the communicating passages 31 are formed and portions where the communicating passages 31 are not formed, tightening force acting on the outer circumferential surface of the stator 10 from the inner circumferential surface of the case 30 is not homogeneous over the whole circumferential portion of the stator 10.

When assembling the stator 10 to the case 30 by shrink fitting, heat is applied to the case 30 to expand the case 30, and then, the case 30 is cooled down after the stator 10 is inserted into (or, positioned inside) the case 30. When a temperature of the case 30 is reduced to a normal temperature, the case 30 shrinks to fit the stator 10. At this time, at the portions of the outer circumferential portion of the stator 10 which do not face the communicating passages 31, the stator 10 and the case 30 contact each other so that a tightening force acts on such portion. On the other hand, at the portions of the outer circumferential portion of the stator 10 facing the communicating passages 31, the tightening force does not directly act thereon. Hereinafter, the portions of the stator 10 which do not face the communicating passages 31 are referred to as first circumferential portions, and the portions of the stator 10 facing the communicating passages 31 are referred to as second circumferential portions. The tightening force acting on the second circumferential portions of the stator 10 is directed radially towards the axial center Z (see FIG. 1). Accordingly, the tightening force acting on the stator 10 is applied as bending force to the second circumferential portions of the stator 10. Because the radial tightening force applied by the case 30 does not directly act on the second circumferential portions of the stator 10, only the bending force act on the second circumferential portions. Accordingly, a deformation such as bending may be readily generated at the second circumferential portions of the stator 10. More specifically, in a condition where the second circumferential portions correspond to the narrow portions 14 of which rigidity is lower, a deformation such as buckling may be generated at the stator 10.

However, according to the embodiment, the supporting portion 40 contacting an outer surface of the stator 10 is provided at a position corresponding to one of the narrow portion 14 of which rigidity is low. Accordingly, the narrow portion 14 is surely supported so that the deformation such as the buckling is prevented from being generated. Further, an increase of iron loss of the motor X is restrained.

On the assumption that such deformation is generated at the stator 10, an external force generated in accordance with the deformation acts on the stator coil 17. However, such external force is not generated according to the embodiment, so that a deterioration of the stator coil 17, such as wire breaking (cutting), is prevented from occurring. Further, because a contacting space between the stator 10 and the case 30 becomes large by providing the supporting portion 40, a heat transfer from the stator 10 to the case 30 is promoted. Thus, a heat radiation efficiency of the motor X is improved. Accordingly, the motor X can be downsized.

The supporting portion 40 is structured to include a first supporting portion 40a and a second supporting portion 40b. The first supporting portion 40a contacts an outer circumferential surface 11a of the stator 10 when attached thereto. The second supporting portion 40b contacts an axial end surface 11b formed at an axial end of the stator 10. So configured, the outer circumferential surface 11a of the stator 10 and the axial end surface 11b thereof are surely supported by the supporting portion 40.

In a condition where the stator 10 is assembled to the case 30 by press fitting, the stator 10 is press-fitted into the stator 10 in the Z-axial direction so that the end surface 11b of the stator 10 makes contact with a stator retainer 33 formed at the case 30. Because the stator 10 is formed by laminating the plural disc-shaped thin plates 16 in the cylindrical shape, end thin plates 16 positioned adjacently to an axial end of the stator 10 may be readily separated from the neighboring thin plates 16 by press fitting the stator 10 into the case 30.

According to the embodiment, because the supporting portion 40 includes the second supporting portion 40b in addition to the first supporting portion 40a contacting the outer circumferential surface of the stator 10, a contact force is applied to the axial end surface 11b of the stator 10 in a laminating direction of the stator 10 when inserting the stator 10 into the case 30. Accordingly, each of the thin plates 16 structuring the stator 10 is prevented from being separated from the neighboring thin plates 16, thereby surely preventing a deformation of the stator 10.

The supporting portion 40 is arranged at a position corresponding to a central position C1 (serving as a circumferential central position) of a circumferential width W1 defined between two adjacent tooth portions 13. More specifically, the central position C1 is a circumferentially central position of each narrow portion 14. The rigidity of the stator 10 at the central position C1 is lower than other portions of the stator 10. Further, the acting force is concentrated at the central position C1 the most among the portions of the stator 10 when assembling the stator 10 to the case 30. According to the embodiment, because the supporting portion 40 for supporting the central position C1 of the narrow portion 14 is provided, the deformation of the stator 10 is effectively prevented.

In regards to the communicating passage 31, a circumferential width W2 of the communicating passage 31 is variable, so that there exists a communicating passage 31 of which circumferential width W2 is not so wide. In such communicating passage 31, because the acting force concentrated at the stator 10 at the position corresponding to such communicating passage 31 becomes small, the supporting portion 40 may not necessarily be provided at the communicating passage 31. Therefore, not only the communicating passage 31 including the supporting portion 40 (hereinafter, referred to as first communicating passage 31), but also the communicating passage 31 without the supporting portion 40 (hereinafter, referred to as second communicating passage 31) is also provided at the case 30. Even with the structure where the second communicating passage 31 is provided, the positions of the second communicating passages 31 are arranged to respectively face the wide portions 15 of which rigidity is high, in order to reduce an effect applied to the stator 10 to be as small as possible. Accordingly, the deformation rarely occurs to the case 30.

Herein, a circumferentially central position of the circumferential width W2 of the second communicating passage 31 is assigned to be a central position C2. According to the embodiment, a relative position between the stator 10 and the case 30 is determined so that the central position C2 of the second communicating passage 31 faces the wide portion 15. Accordingly, at least a half circumferential portion of the circumferential width W2 of the second communicating passage 31 is arranged to face the wide portion 15 of the yoke portion 12, thereby effectively preventing the deformation of the stator 10.

Figure 5:
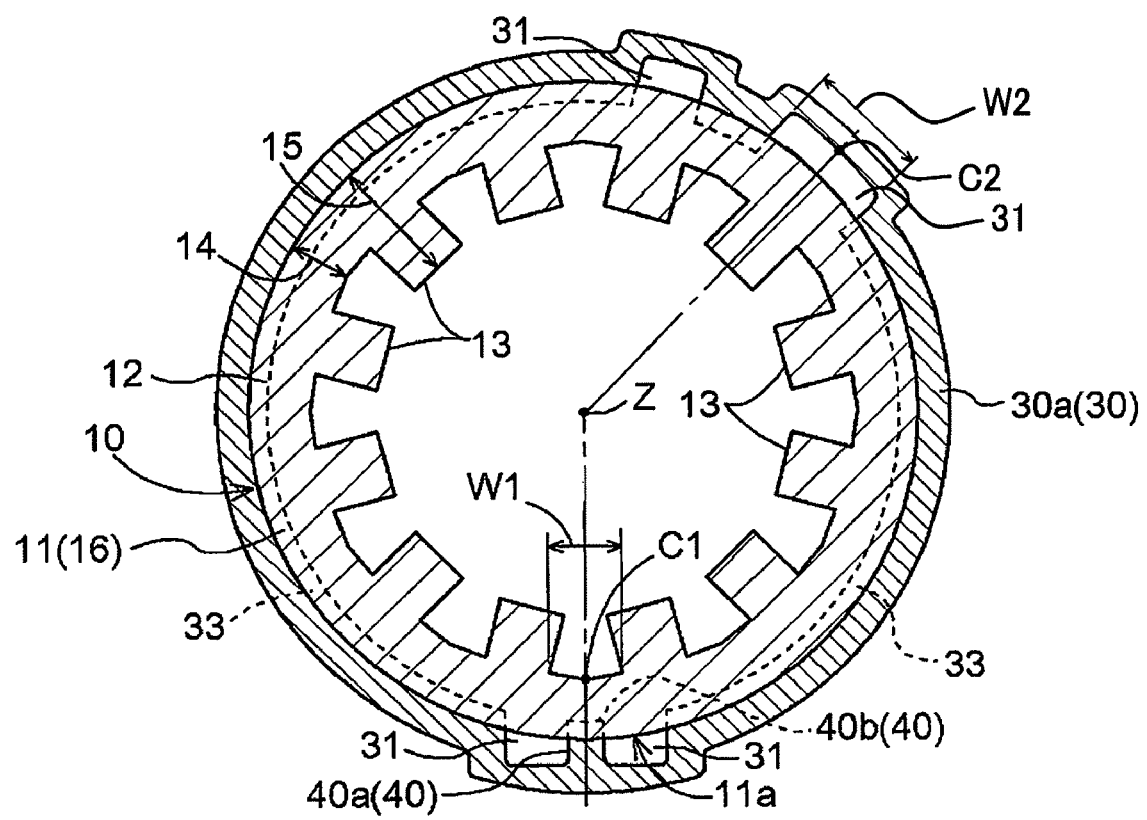
FIG. 5 is a schematic view illustrating the motor including a plurality of second communicating passages.

As illustrated in FIG. 5, plural second communicating passages 31 may be provided at the case 30. In such a condition, the relative position between the stator 10 and the case 30 may not be determined so as to arrange the central position C2 of the circumferential width W2 of all the second communicating passages 31 to respectively face the wide portions 15. According to the second communicating passage 31 of which circumferential width W2 is wide, a range where the inner circumferential surface of the case 30 does not contact (retain) the outer circumferential surface of the stator 10 is arranged to be wide. In other words, the wider the circumferential width W2 is, the wider the range where the inner circumferential surface of the case 30 does not contact (retain) the outer circumferential surface of the stator 10 becomes. Accordingly, such second communicating passage(s) 31 with wide circumferential width W2 is easily positioned at the narrow portion(s) 14 of the stator 10, of which rigidity is weak, and the deformation may be generated at the stator 10 at the position corresponding to such communicating passage 31.

Accordingly, a relative position between the central positions C2 of the second communicating passages 31 and the wide portions 15 of the stator 10 is determined so as to arrange the central positions C2 of the second communicating passages 31 to face the wide portions 15 of the stator 10 in a prioritized order from the second communicating passage 31 having wide circumferential width W2 to the second communicating passage 31 having narrower circumferential width W2. Due to such structure, the central position C2 of one of the second communicating passages 31 having the widest circumferential width W2, of which effect applied to the stator 10 is the largest, is located to face one of the wide portions 15 of the stator 10 prior to the other second communicating passages 31. Therefore, the deformation which may be generated at the stator 10 is restrained to be a minimum.

A modified embodiment will be described hereinafter.

Figure 4:
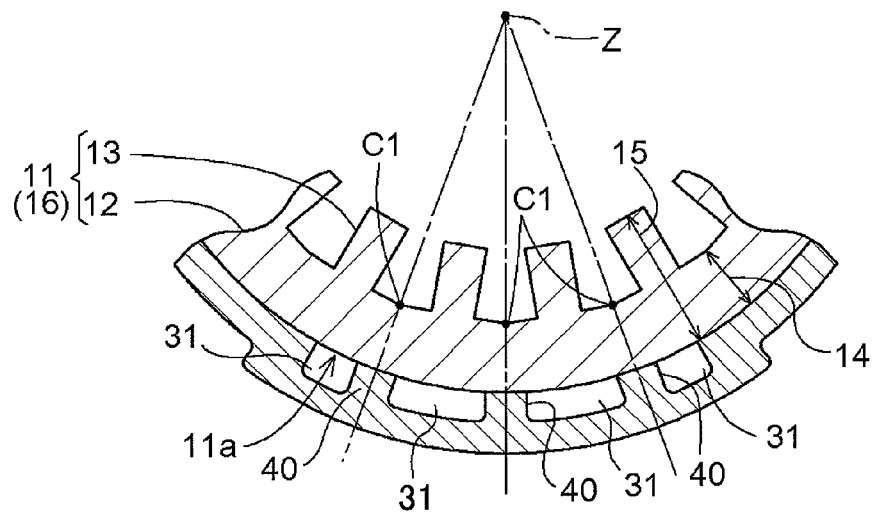
FIG. 4 is a schematic view illustrating a main portion of a motor according to a modified embodiment.

<1> According to the embodiment described above, a singular supporting portion 40 is provided inside the communicating passage 31. Alternatively, as illustrated in FIG. 4, in a state where the circumferential width W2 of the communicating passage 31 extends along plural wide portions 15, plural supporting portions 40 may protrude from the inner circumferential surface of the case 30 to divide the communicating passage 31 into plural passage portions and may be arranged to contact the outer surface of the stator 10 at the narrow portions 14, respectively. More specifically, the supporting portions 40 are arranged to respectively contact the outer surface of the stator 10 at the central positions C1 of the circumferential width W1 between the adjacent tooth portions 13. Further, in a condition where a circumferential width of each passage portions is different from each other, a relative position between the passage portions of the communicating passage 31 and the wide portions 15 of the stator 10 may be determined so as to arrange the passage portions to face the wide portions 15 of the stator 10 in a prioritized order from the passage portion having wide circumferential width to the passage portion having narrower circumferential width.

By forming the communicating passage 31 with the wide circumferential width W2, the range where the inner circumferential surface of the case 30 does not contact (support) the outer circumferential surface of the stator 10 becomes larger. In such a state, according to the modified embodiment, plural narrow portions 14 are provided within the above described range. Even in such a condition, the plural supporting portions 40 provided inside the communicating passage 31 contact the outer circumferential surface of the stator 10 at the position corresponding to the narrow portions 14 respectively. Thus, even in a condition where the circumferential width W2 of the communicating passage 31 is wide, the deformation such as buckling is prevented from being generated.

<2> According to the embodiment described above, the supporting portion 40 is formed integrally with the case 30. However, the present invention is not limited to this. Alternatively, the supporting portion 40 may be structured separately from the stator 10 and the case 30. Accordingly, a form of the case 30 is simplified, so that the case 30 may be structured easily.

<3> Still further according to the above described embodiment, the stator core 11 is formed in a cylindrical shape by laminating the plural disc-shaped thin plates 16 in the Z-axial direction of the motor X. At this time, each of the thin plates 16 may be fixed by adhesive agent such as bonds, for example. In such a state, the rigidity of the stator core 11 is increased specifically at the end portions in the laminating direction. Accordingly, the deformation of the motor X may be prevented from being generated.

The structure described above may be adapted to a motor including a stator, which is formed in a cylindrical shape by laminating plural thin plates and includes a yoke portion for accommodating a rotor inside thereof and plural tooth portions protruding from an inner circumferential surface of the yoke portion towards an axial center, and at which narrow portions without tooth portions and wide portions with tooth portions are formed alternately in a circumferential portion of the stator, and a case which is adapted to surround the stator for retaining the same and at which a communicating passage extending in an axial direction thereof is formed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motor, comprising:
a stator formed in a cylindrical shape by piling a plurality of annular shape disc plates in an axial direction of the motor, the stator including a yoke portion accommodating a rotor therein and having a plurality of first portions and a plurality of second portions, the second portions having a radial length longer than a radial length of the first portions, and the first portions and the second portions being alternately formed in a circumferential direction of the stator, and a plurality of tooth portions respectively formed at the second portions of the yoke portion and radially protruding from an inner circumferential surface of the yoke portion at the second portion of the yoke portion towards an axial center of the stator;
a case provided at an outer circumference of the stator for supporting the stator and including a first communicating passage extending in an axial direction of the stator and defined by an inner circumferential surface of the case, the first communicating passage in communication with both axial ends of the stator; and
a supporting portion protruding from an inner circumferential surface of the first communicating passage towards the stator and contacting an outer surface of the disc plates of the stator at one of the first portions of the stator;
each of the disc plates being formed from a single circular piece;
an outer shape of each of the disc plates being circularity; and
all of the plurality of first portions contact the supporting portion or an inner surface of the case.

2. A motor according to claim 1, wherein
the supporting portion includes a first supporting portion contacting an outer circumferential surface of the stator and a second supporting portion contacting an axial end surface of the stator.

3. A motor according to claim 1, wherein
the supporting portion is arranged to contact the outer surface of the stator at a circumferentially central position defined between adjacent tooth portions.

4. A motor according to claim 1, wherein
the case includes at least one second communicating passage, at which the supporting portion is not provided, extending in the axial direction of the stator at an inner circumferential surface of the case to be in communication with the both axial ends of the stator, and
a circumferentially central position of the second communicating passage is arranged to face one of the second portions of the stator.

5. A motor according to claim 4, wherein
the first communicating passage and the second communicating passage are groove portions formed by radially outwardly recessing the inner circumferential surface of the case,
the supporting portion radially inwardly protrudes from a bottom surface of the groove portion by the first communicating passage.

6. A motor according to claim 4, wherein
the at least one second communicating passage comprises a plurality of second communicating passages, and
the circumferentially central position of one of the second communicating passages having the widest circumferential width is positioned to face one of the second portions of the stator.

7. A motor according to claim 4, wherein
a relative position between the circumferentially central positions of the second communicating passages and the second portions of the stator is determined so as to arrange the circumferentially central positions of the second communicating passages to face the second portions of the stator.

8. A motor according to claim 1, wherein
a plurality of the supporting portions protrude from the inner circumferential surface of the case to divide the first communicating passage into a plurality of passage portions and are arranged to contact the outer surface of the stator at the first portions, respectively.

9. A motor according to claim 8, wherein
the plurality of supporting portions is respectively arranged to contact the outer surface of the stator at a plurality of the circumferentially central positions between adjacent tooth portions.

10. A motor according to claim 8, wherein
a relative position between the plurality of passage portions of the first communicating passage and the second portions of the stator is determined so as to arrange a center of the passage portion to face the second portion of the stator with respect to a circumferential direction.

11. A motor according to claim 1, wherein
the supporting portion is formed at a circumferentially central position of the first communicating passage.

12. A motor according to claim 1, wherein
the stator is formed by laminating the plurality of disc plates and fixing the plurality of disc plates by means of an adhesive agent.

13. A motor according to claim 1, wherein
an axial length of the disc plate is smaller than a radial length of the first portions of the stator.

* * * * *